United States Patent [19]
Ammons et al.

[11] 3,965,057
[45] June 22, 1976

[54] ADHESION CONTROL FOR SAFETY GLASS LAMINATES VIA POLYURETHANE COMPOSITION

[75] Inventors: Vernon G. Ammons, Glenshaw; James C. Vanek, New Kensington, both of Pa.

[73] Assignee: PPG Industries, Inc., Pittsburgh, Pa.

[22] Filed: Feb. 19, 1975

[21] Appl. No.: 551,188

Related U.S. Application Data

[62] Division of Ser. No. 403,138, , Pat. No. 3,900,686.

[52] U.S. Cl. .................... 260/18 TN; 260/29.15 B; 260/30.6 R; 260/75 TN; 260/77.5 R; 260/77.5 AN; 428/425
[51] Int. Cl.$^2$ ................ C08G 18/30; B32B 27/18; B32B 27/40
[58] Field of Search ...... 260/75 TN, 77.5 R, 18 TN, 260/29.15 B, 30.6 R; 428/425

[56] References Cited
UNITED STATES PATENTS

| | | |
|---|---|---|
| 3,309,261 | 3/1967 | Schiller et al. .................... 161/190 |
| 3,391,054 | 7/1968 | Lewis et al. .................... 161/186 |
| 3,468,819 | 9/1969 | Szabat .................... 260/75 TN |
| 3,764,457 | 10/1973 | Chang et al. .................... 428/412 |
| 3,791,914 | 2/1974 | Ammons et al. .................... 428/425 |
| 3,806,486 | 4/1974 | Endriss et al. .................... 260/75 TN |

Primary Examiner—H. S. Cockeram
Attorney, Agent, or Firm—William J. Uhl

[57] ABSTRACT

An improved polyurethane composition useful as an interlayer for safety glass window applications such as bilayer motor vehicle windshields is disclosed. The polyurethane is specially formulated with an organic silane and an organic phosphorus acid to provide a controlled degree of adhesion to glass maintainable under a wide range Of humidity and temperature conditions, particularly higher temperature and humidity conditions, which are especially detrimental to the maintenance of adhesion. The controlled degree of adhesion between the polyurethane and the glass provides improved penetration resistance in glass-polyurethane safety glass laminates.

19 Claims, No Drawings

ADHESION CONTROL FOR SAFETY GLASS LAMINATES VIA POLYURETHANE COMPOSITION

This is a division of application Ser. No. 403,138, filed Oct. 3, 1974, now U.S. Pat. No. 3,900,686.

BACKGROUND OF THE INVENTION

1. Field of the Invention

This invention relates to polyurethane compositions having controlled adhesion to glass. More particularly, this invention relates to the use of such compositions in laminated safety glass articles, particularly motor vehicle windshields.

2. Brief Description of the Prior Art

Motor vehicle safety glass windshields have for some time been made in a trilayer configuration; namely, two plies of glass bonded together with a plastic interlayer, usually polyvinyl butyral. The trilayer windshield offers significant safety advantages over older monolithic type of windshields comprising one solid layer of glass. First, when the safety glass windshield is subjected to a fracturing impact, either from inside or outside of the motor vehicle, the plastic interlayer acts to hold the broken fragments of glass together, preventing them from flying about the inside of the car. Second, the plastic interlayer acts as a diaphragm when it is impacted and absorbs a significant amount of energy from the impacting object, thereby reducing its velocity and preventing penetration of the windshield.

Although the trilayer windshield is a significant improvement over the monolithic glass windshield, it is still, unfortunately, one of the principal sources of personal injury involving automobile accidents, being a major cause of both concussive and lacerative-type injuries.

In an effort to overcome the injury potential of trilayer windshields, there have been suggestions in the prior art to remove the inner ply of glass, thereby exposing the inner plastic ply. The inner plastic ply is generally much softer than the glass and does not present the danger of long splines of glass which can severely cut and abrade the face and head portion of an occupant impacting the windshield. Pertinent prior art on bilayer windshields appears to be the following U.S. Pat. Nos. 1,098,342 to Benedictus, 1,342,267 to Mascart, 2,047,253 to Brooks, 2,143,482 to Herrmann et al., 2,184,876 to Sherts, 2,234,829 to Neher et al., 2,454,886 to Saprio, 2,489,026 to Gilbert, 2,526,728 to Berk et al., 3,157,563 to Baum, 3,532,590 to Priddle and 3,575,790 to Fleck.

Besides bilayer windshield configurations, there have also been suggestions in the prior art to use optically clear polyurethanes as an improved safety glass interlayer for replacing polyvinyl butyral. The polyurethanes have good impact resistance over a wide range of temperatures and cause little lacerative injury and are superior to safety glass laminates employing polyvinyl butyral interlayers commercially employed at the present time. Typical patents directed to the use of polyurethanes as an interlayer material are U.S. Pat. Nos. 3,509,315 to Wismer et al. and 3,620,905 to Ahramjian and Belgium Pat. No. 785,125.

The polyurethanes are, however, pervious to moisture and additional care must be taken with bilayer configurations. With bilayers, the polyurethane is exposed on one side directly to the atmosphere with no glass sheet available as a moisture-impervious barrier. Under high humidity conditions, moisture penetrates the polyurethane from the exposed surface to the interfacial glass-polyurethane surface where it will degrade the adhesion at the interface. If humidity and temperature conditions are high enough, delamination may result.

The problem of poor adhesion under high humidity and temperature conditions can be overcome if the glass surface is primed with an organic silane or if the silane is incorporated into the polyurethane before windshield fabrication. Unfortunately, the silane usually promotes very high adhesion which minimizes the safety performance of the resultant laminated bilayer wiindshield. With very high adhesion, the bilayer behaves more as a monolithic structure in which the flexible polyurethane does not stretch and absorb energy upon impact. As a result, concussive injuries caused by an unyielding windshield can become severe. Also, very high levels of adhesion can result in reduced impact resistance of the windshield. The undesirability of high levels of glass-plastic adhesion with regards to conventional trialyer windshields has been recognized in the prior art as exemplified by U.S. Pat. No. 3,505,160 to Michaels et al. and Canadian Pat. No. 861,469 to Ammons et al.

Therefore, it would be desirable to provide an improved polyurethane composition which, when laminated to glass, provides a controlled level of adhesion to the glass and the desired impact properties. Further, it is necessary that this polyurethane composition be able to maintain its controlled level of adhesion to glass under a wide range of temperature and humidity conditions, particularly under high humidity and temperature conditions such that it can be used in bilayer safety glass applications. This invention provides such a composition and also provides resultant safety glass laminates prepared with such composition in sheet form.

SUMMARY OF THE INVENTION

This invention provides an optically clear polyurethane composition containing a small proportion of a novel combination of adhesion-modifying additives. The polyurethane composition is prepared from a polyisocyanate and a compound or compounds having a pair of groups reactive with the isocyanate groups. The polyurethane composition contains as a preferred adhesion modifier about 0.01 to 0.20 percent by weight, based on total composition weight, of an organic phosphorus acid particularly an organic acid ester of phosphorus and 0.05 to 0.50 percent by weight, based on total composition weight, of an organo-functional silane. The weight ratio of organic phosphorus acid to organo-functional silane is about 0.05 to 0.80:1.

Polyurethanes with the requisite portions of organic phosphorus acid and organo-functional silane when laminated to glass have a controlled low degree of adhesion which is maintainable under a wide range of humidity and temperature conditions, particularly under high humidity and temperature conditions. This controlled low level of adhesion makes safety glass laminates, particularly glass-polyurethane bilayer laminates, excellent energy absorbers. The low adhesion allows sufficient interlayer to release from the glass so that it can stretch without tearing to absorb the impact energy. Such laminates have a mean penetration velocity of at least 30 miles per hour for a 5-pound freely falling steel ball impacted on the polyurethane side at a laminate temperature of 70°F. when a 0.030–0.040 inch thick polyurethane layer is adhered to a ⅛-inch thick 12 inch by 12 inch float glass sheet to form the laminate, the laminate being held rigid and being adhered to the glass with a 90° peel strength of about 1 to 10 pounds per lineal inch as determined by NASA TECH BRIEF 65-10173. Comparable laminates prepared without organic phosphorus acids, but with organo-functional silanes, have much higher degrees of adhesion, i.e., peel strengths, on the order of 50 to 100 pounds per lineal inch, and lower mean penetration velocity, i.e., on the order of 20 miles per hour at 70°F. Comparable laminates prepared without organic silanes but with organic phosphorus acids have a tendency to delaminate at high humidity and temperature conditions. Glass-polyurethane bilayer laminates prepared according to this invention maintain their initial low degree of adhesion upon exposure to severely high temperature and humidity conditions. For example, after as much as a 30-day exposure at 120°F. and 100 percent relative humidity, there is essentially no loss of adhesion nor of good impact properties.

DETAILED DESCRIPTION

The organic phosphorus acids useful in the practice of this invention are selected from those which would satisfy the following general structural formulas:

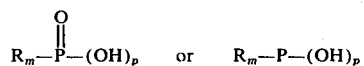

wherein R is an organic radical and $m$ and $p$ are integers of from 1 to 2 and $m$ plus $p$ must equal to 3. Although the formula above indicates that the acidic hydrogen is connected to the phosphorus atom through an oxygen linkage, a sulfur linkage should also be suitable. The term "organic radical" is intended to include moieties in which a carbon atom is linked directly to the phosphorus atom or linked via an oxygen atom. The organic radical R can include an alkyl, aryl, alkaryl group or an alkoxy, aryloxy, alkaryloxy group. Further, the organic radical can be substituted with substituent groups such as nitro, halogen, e.g. chloro and fluoro, alkyl and alkoxy groups that do not detrimentally affect the polyurethane or the resultant laminates prepared therefrom. Such detrimental effects would be loss of optical quality or other physical properties of the polyurethane which contribute to its impact performance. When $m$ is greater than 1 in the above structural formula, the organic radicals can be the same or different. Typical classes of compounds encompassed within the above structural formula are phosphonic acids, phosphonous acids, phosphinous acids and organic acidic phosphorus esters which include phosphates, phosphites and phosphonates. More specifically, such compounds include:

a. primary phosphonic acids, $RP(O)(OH)_2$, wherein R is an organic radical as described immediately above. Examples of such compounds include $C_2H_5PO(OH)_2$, $C_4H_9PO(OH)_2$, n-$C_{12}H_{25}PO(OH)_2$, n-$C_{18}H_{37}PO(OH)_2$, $C_6H_5CH_2PO(OH)_2$, 4-$CH_3C_6H_4CH_2PO(OH)_2$, $ClCH_2CH_2PO(OH)_2$, $C_6H_5PO(OH)_2$, 4-$ClC_6H_4PO(OH)_2$, 4-$NO_2C_6H_4CH_2PO(OH)_2$, n-$C_6H_{13}CHOH\cdot PO(OH)_2$;

b. secondary phosphonic acids, $R_2P(O)OH$, wherein R is an organic radical as described above; examples include $(CH_3)_2PO(OH)$, $(C_5H_{11})_2PO(OH)$, $(C_6H_5CH_2)_2PO(OH)$, $C_6H_5(Cl_3C)PO(OH)$, (1-$C_{10}H_7)_2PO(OH)$, (4-$(C_2H_5)_2NC_6H_4)_2PO(OH)$;

c. phosphonous acids, $RPO_2H_2$, wherein R is an organic radical as described above; examples include $C_2H_5PO_2H_2$, n-$C_8H_7PO_2H_2$, 4$(CH_3)NC_6H_4CHPO_2H_2$, (2-$HOC_6H_4)\cdot CHOH\cdot PO_2H_2$, $C_6H_5PO_2H_2$, 4-$ClC_6H_4PO_2H_2$, 2$O_2NC_6H_4PO_2H_2$, 2$CH_3C_6H_4PO_2H_2$;

d. phosphinous acids, $R_2POH$, wherein R is an organic radical as described above; examples include diethyl phosphinous acid;

e. primary phosphites, $ROPO_2H_2$, wherein R is an organic radical as described above; examples include $CH_3OPO_2H_2$, $ClCH_2CH_2OPO_2H_2$, $CF_3CHCH_3OPO_2H_2$, 2$C_8H_{17}OPO_2H_2$, 4-$C_6H_5CH_2CH_2C_6H_4CH_2CH_2OPO_2H_2$;

f. secondary phosphites, $(RO)_2POH$, wherein R is an organic radical as described above; examples include $(CH_3O)_2POH$, $(C_4H_9O)_2POH$, (n-$C_6H_{13}O)_2POH$, (n-$C_8H_{17}O)_2POH$, ((2-$CH_3C_6H_4OCH_2)_2CH\cdot O)POH$;

g. primary phosphates, $ROP(O)(OH)_2$, wherein R is an organic radical as described above; examples include $CH_3OPO(OH)_2$, $ClCH_2CH_2OPO(OH)_2$, 2,ethylhexyl acid phosphate, lauryl acid phosphate, stearyl acid phosphate, cresyl acid phosphate, benzyl acid phosphate;

h. secondary phosphates, $(RO)_2P(O)OH$, wherein R is an organic radical as described above; examples include $(CH_3O)_2PO(OH)$, $(C_3H_7O)_2PO(OH)$, (n-$C_{16}H_{33}O)_2PO(OH)$, $(C_2H_5O)(C_6H_5CH_2O)PO(OH)$, $(C_2H_5O)(ClCH_2CH_2O)PO(OH)$, $(F_2CH\cdot CH_2O)_2PO(OH)$, (2-$ClC_6H_4O)_2PO(OH)$.

A more detailed description of organic phosphorus acids can be found in Organophosphorus Compounds, G. N. Kosolapoff, New York, John Wiley & Sons, Inc., London, Chapman and Hall, Limited, 1950. In particular, reference is made to pages 148–171 which list various phosphonic acids, pages 146–148 which list various phosphonous acids, page 171 which lists various phosphinous acids, pages 201–203 which list various phosphites and pages 245–258 which list various phosphates.

Also, in the practice of the present invention, mixtures of various organic phosphorus acids can be used.

The molecular weight of the organic phosphorus acids should be at least about 96, preferably about 209 to 461. The preferred organic phosphorus acids are alkyl acid phosphates in which the alkyl group contains from 1 to 18 carbon atoms, e.g. methyl acid phosphate, 2-ethylhexyl acid phosphate, lauryl acid phosphate and stearyl acid phosphate, with stearyl acid phosphate and lauryl acid phosphate being preferred. Commercially available alkyl acid phosphates are mixtures of monoalkyl acid phosphate and dialkyl acid phosphate. These mixtures are called alkyl acid phosphates. The alkyl acid phosphates usually contain small quantities of condensed phosphates such as pyro- and polyphosphates, along with the mono- and dialkyl orthophosphates. There are also small amounts of free alcohol and phosphoric acid present. Preferably the alkyl groups in the alkyl acid phosphates contain greater than 6 and preferably from about 8 to 18 carbon atoms. Alkyl acid phosphates with alkyl chains containing less than 6 carbon atoms are not preferred because they do not significantly reduce the adhesion in the resultant laminate at the preferred low concentrations employed in this invention. Higher concentrations must be employed and this detracts from the physical properties of the polyurethane to which the alkyl acid phosphate is added.

The silane compounds useful in the practice of this invention are the well-known class of organo silanes which promote the adhesion of various resinous materials, particularly polyurethanes, to glass. These coupling agents are organo-functional silanes which possess two different kinds of reactivity. The silicon portion of the silanes has an affinity towards glass and the organic portion which is a stable graft onto the silicon atom has an affinity for the polyurethane resin. The silane compounds useful in the practice of this invention have the following general structural formula;

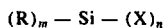

wherein $m$ and $n$ are whole integers of from 1 to 3 and $m$ plus $n$ is equal to 4 and preferably $m$ is equal to 1 and $n$ is equal to 3. X represents a moiety which can hydrolyze to yield a hydroxyl group. Examples include chloro and groups represented by the formula OR' wherein R' can be an aliphatic hydrocarbon radical of less than 5 carbon atoms such as methyl, ethyl, isopropyl, butyl, vinyl or allyl or any acyl radical of less than 5 carbon atoms such as formyl, acetyl or propionyl.

R represents an organic moiety which is a stable graph onto the silicon and is selected from the class consisting of alkyl containing from 1 to 5 carbon atoms, such as methyl, ethyl, normal propyl, and amyl; vinyl such as ethenyl and propenyl; and aryl such as phenyl.

Preferably R is a normal-propyl derivative having the following structure;

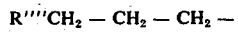

wherein R'''' is equal to ethyl acryloxy, methacryloxy, glycidoxy, amino, N-bis(beta-hydroxyethyl)amino, N-bis(aminoethyl)aminopropyl and chloropropyl.

Also preferred are silanes in which R contains an epoxy moiety. In this instance R in the above structural formula would be equal to:

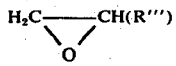

wherein R''' is a divalent hydrocarbon radical of less than 10 carbon atoms or a divalent radical of less than 10 carbon atoms composed of C, H and O atoms, with the oxygen of this radical being in the form of ether linkages.

Examples of suitable silane compounds include the following: vinyl trichlorosilane, vinyl triethoxysilane, vinyl-tris(beta-methoxyethoxy) silane, gamma-methacryloxypropyltrimethoxysilane, beta-(3,4-ethoxycyclohexyl)ethyltrimethoxysilane, gamma-glycidoxypropyltrimethoxysilane, vinyltriacetoxysilane, gamma-aminopropyltriethoxysilane, N-bis(beta-hydroxyethyl) gamma-aminopropyltriethoxysilane, N-beta-(aminoethyl)-gamma-aminopropyltrimethoxysilane, methyltrimethoxysilane, ethyltrimethoxysilane, amyltriethoxysilane, ethyltrichlorosilane, vinyltriacetoxysilane, and gamma-mercaptopropyltrimethoxysilane, with gamma-glycidoxy-propyltrimethoxysilane being preferred.

Also mixtures of various organo-functional silanes can be used.

The identity and the amount of the adhesion modifiers, i.e., the organic phosphorus acid, and of the organo-functional silane incorporated into the polyurethane, and the ratio of organic phosphorus acid to organo-functional silane should be carefully controlled so as to insure that upon lamination of the polyurethane to glass, a controlled level of adhesion of from 1 to 10 pounds per lineal inch (90° Peel Test) between the polyurethane and glass is obtained with accompanying desired penetration resistance. Further that this adhesion should be maintainable particularly under severe exposure conditions such as high humidity and temperature. The adhesion modifiers in the amounts chosen should not detrimentally affect the physical properties of the polyurethane which are necessary for safety glass laminate use, that is, the optical properties of the polyurethane when laminated to glass should not be detrimentally affected, nor should the physical properties of the polyurethane which contribute to its penetration resistance be detrimentally affected.

To meet the above requirements, the concentration of the organic phosphorus acid should be maintained within the range of from 0.01 to 0.30 percent by weight, and preferably 0.03 to 0.20 percent by weight based on total formulation or composition weight, and the concentration of the organo-functional silane should be maintained within the range of 0.05 to 0.5 and preferably 0.15 to 0.3 percent by weight based on total formulation or composition weight. By total formulation or composition weight is meant the combined weight of all ingredients present in the urethane composition other than the adhesion-control additives, that is, total weight of all reactants used to prepare the polyurethane, i.e., polyisocyanate compound or compounds containing groups reactive with the isocyanate groups, as well as ingredients such as catalyst. In addition, the weight ratio of organic phosphorus acid ester to organo-functional silane should be maintained within the range of 0.05 to 0.80, preferably 0.15 to 0.65. If too much of the organic phosphorus acid is incorporated into the polyurethane or if the ratio of organic phosphorus acid to organic silane is too high, the degree of adhesion between the polyurethane and glass will be insufficient for bilayer motor vehicle glazing applications. Exposure to high humidity and temperature conditions may cause delamination of the bilayer laminate. On the other hand, if too much of the silane is incorporated into the polyurethane of if the ratio of organic phosphorus acid to silane is too low, the degree of adhesion between the polyurethane and the glass may well be too great, and the resulting laminate will have inferior impact-resistant properties such as decreased penetration resistance.

The proportions of organic phosphorus acid and silane which must be incorporated into the polyurethane to achieve the desired results, that is, a low initial degree of adhesion, and maintenance of this low degree of adhesion upon exposure to a wide range of temperature and humidity conditions, particularly high temperature and humidity conditions, will vary depending upon the identity of the organic phosphorus acid, the organic silane, the structural make-up of the polyurethane itself, as well as the presence of any optional ingredients, particularly catalyst, in the polyurethane formulation. For example, generally less of a longer carbon chain organic phosphorus acid is required than a shorter carbon chain organic phosphorus acid to achieve the same desired reduced level of adhesion. Also, a polyurethane made from a polycarbonate diol generally requires more organic phosphorus acid than a comparable polyurethane prepared with a polyester diol.

Since there are many variables which may affect the amounts and proportions of adhesion-controlling additives which should be incorporated into the polyurethane formulation, an empirical technique of selecting the additives and their relative proportions are advisedly used in optimizing the particular formulation involved. However, as a general guideline, the ranges and proportions of organic phosphorus acids and organofunctional silanes as specified above should be adhered to.

The preferred procedure for utilizing the organic phosphorus acids and the organo-functional silanes is to disperse them throughout the polyurethane layer by mixing them with the urethane-forming ingredients before polymerization. This insures uniform distribution of the adhesion modifiers throughout the polyurethane layer and minimizes the fabricational steps necessary for the preparation of the laminates. The additives can be added to either the isocyanate or active hydrogen-containing, e.g. polyol component, depending on which component the additives are most compatible. Moderate heating and stirring or agitation can be used. Most of the organo-functional silanes appear to be soluble in polyols as are some of the alkyl acid phosphates such as lauryl acid phosphate. Stearyl acid phosphate, on the other hand, is not compatible with most polyols but is compatible with most polyisocyanates. When the adhesion modifiers are added to long chain polyols such as a polyester diol, the polyol should be melted and the adhesion modifier added to the liquid melt with stirring. A similar procedure should be used with the polyisocyanates, that is, the adhesion modifiers should be added to a liquid polyisocyanate with stirring until solution is obtained. Also, the adhesion modifiers can be added to liquid urethane prepolymers with mild heating and stirring.

Applicants are not certain in what form the adhesion modifiers are when they are distributed throughout the polyurethane layer, that is, whether they have reacted with the polyurethane, the urethane-forming reactants, other ingredients present in the composition or each other, or whether the modifiers are present merely as additives being unreacted. The concentration of the modifiers is so small that an analysis is difficult and uncertain. Thus, although it may be mentioned in the specification that the adhesion modifiers are additives, it should be apparent that some reaction with other ingredients is possible. All that can be said is that the adhesion modifiers can be incorporated in the polyurethane layer or that the polyurethane layer contains the adhesion modifiers. What is meant by this is that the adhesion modifiers are present as additives or as reaction products with other ingredients in the polyurethane composition.

Besides incorporating the adhesion modifiers in the polyurethane interlayer, one or more adhesion modifiers can optionally be applied as an interfacial film or coating between the glass and the polyurethane layers. A suitable technique for applying the adhesion modifiers as a thin film is first to dissolve or to emulsify the modifiers along with a suitable binder in a vehicle. The solution or emulsion is then applied by conventional film forming or coating techniques to either the glass or the polyurethane substrate to form a continuous wet film. The vehicle is then permitted to evaporate leaving a dry, continuous stable film on the substrate. The purpose of the binder is to provide for a stable, continuous and uniform film which covers and adheres to the substrate.

The binder is preferably a film-forming, transparent polymer, i.e., transparent in the laminate configuration. In the dry film or coating, the binder acts as a matrix for the adhesion modifiers, bonding them to the substrate. The binder also provides viscosity to the coating solution, giving it sufficient body so that it can be used in conventional coating and film-forming equipment. If the binder were not used, it would be very difficult to form a film of the organic phosphorus esters and the organo-functional silanes which are not good film formers. The binder should be one, of course, which will not affect the optical clarity of the resultant laminate nor detract from its physical properties needed for good impact resistance. Examples of suitable binders are polyurethane resins such as are described below and epoxy resins such as high molecular weight self-condensed epoxies and polyepoxides. Such materials are commercially available from the Shell Chemical Company under the trademark EPONOL. Other suitable binders would be fully hydrolyzed polyvinyl-alcohol, hydroxyl-substituted methylphenyl polysiloxanes such as Dow Corning's DC 804 and DC 840, and polyamides such as NYLON (registered trademark of E. I. Du Pont de Nemours and Company) and VERSAMID (registered trademark of General Mills).

The vehicle should be selected so as not to affect the optical properties of the resultant laminate nor detract from its physical properties. Examples of suitable vehicles include N-methyl-2-pyrrolidone, dimethylformamide, chloroform and alcohols such as methanol and ethanol and water. With water and water alcohol emulsions, the hydrolytic stability of the adhesion modifiers should be taken into account.

To form the coating or film-forming solution or emulsion, the adhesion modifiers can be added to the polyermizable reactants used to make the binder before actual polymerization and then polymerization conducted with the adhesion modifiers predissolved or emulsified in the reactants. The polymer binder with the entrained adhesion modifiers could then be dissolved or emulsified in the appropriate solvent. Alternately, the adhesion modifiers and the binder could be added separately to the appropriate solvent and dissolved or emulsified therein. Usually it is necessary in dissolving or emulsifying the binder to use high shear mixing equipment such as a Waring blender. The concentration of the binder should be about 0.1 to 20 percent by weight based on total weight of the solution or emulsion. Concentration of the binder would depend principally on the ultimate thickness of the film desired and the viscosity of the solution desired and on how the film is to be applied to the substrate, be it spraying, roll coating, printing or the like. In general, film or coating thicknesses of from 0.1 to 0.75 mil can be obtained. For spraying, it is desirable to have a thinner solution or emulsion, that is, about a 0.1 to 3 percent by weight binder solution, so as not to clog the spray gun. Also, for spraying, the solution should have a viscosity of between 20 to 50 centipoises at 20°C. and this is readily obtainable with most binders having a 0.1 to 3 percent by weight concentration. With other means of application, such as roll coating or printing, thicker solutions or emulsions, that is, those solutions having viscosities of about 1500 to 15,000 centipoises at 20°C. are required.

After the coating or film-forming solution or emulsion has been applied to either of the interfacial surfaces, i.e., the glass or the polyurethane, the vehicle is evaporated usually at ambient conditions for about 1 to 5 hours depending on the thickness of the film and the volatility of the particular vehicle employed. Slight heat and/or vacuum may be used to help evaporate the vehicle as long as the optical clarity of the film is not affected. In applying the solution to the polyurethane, care should be taken so that the vehicle will not attack the polyurethane and impair its good optical properties. If applied to the polyurethane, a vehicle which is unreactive to the polyurethane should be used or the vehicle should be quickly flashed off the polyurethane immediately after application. Suitable film-forming or coating equipment can be conventional spray guns, roll coating and printing equipment such as is well known in the art. Spray guns are commercially available from Devilbiss Company of Toledo, Ohio, and a particularly suitable one for spraying the above-described solutions or emulsions is a spray gun, Type MBC-No. 584, with a MBC-444 pin. Also, printing equipment such as gravure printers and relief printers can be used.

The concentration of the adhesion modifiers in the resultant dry film should approximately be the same as that specified above for the concentration in the polyurethane interlayer. However, somewhat higher or lower concentrations can be used, depending on how the adhesion modifiers affect the adhesion of the polyurethane interlayer to glass and how they affect the impact properties of the resultant laminate. It should be clear that the concentration of adhesion modifiers in the resultant film should be that required to get a controlled low degree of adhesion with accompanying desirable penetration resistance described above.

It should be clear from the above discussion that the adhesion modifiers can both be applied in the form of a thin film or one or more adhesion modifiers can be applied as a thin film and one or more adhesion modifiers can be incorporated in the polyurethane layer of the laminate. Also, in the specification and claims where a laminate comprising a thin, energy absorbing layer of a polyurethane composition bonded on at least one of its major surfaces to a glass sheet, said polyurethane containing an organic phosphorus acid and an organofunctional silane is specified, the laminate is meant to include those configurations in which the energy absorbing layer of polyurethane contains the adhesion modifying agents in the layer itself as well as those configurations in which one or more adhesion modifiers is present in a thin film interposed between the polyurethane layer and the glass sheet. The two types of configurations are equivalent for the purposes of this invention.

The polyurethane components which are useful in the practice of this invention can broadly be described as the reaction product of a polyisocyanate or polythioisocyanate and a compound or compounds that have at least two groups per molecule reactive with the isocyanate or thioisocyanate groups which upon lamination to glass form a clear, transparent laminate with the glass. Thus, for example, an organic diisocyanate can be reacted with a polyol having at least 2 active hydrogens per molecule, as determined by the Zerewitinoff test described in Kohler, *J. Am. Chem. Soc.*, 49, 3181 (1927).

The organic polyisocyanate component should preferably be an organic diisocyanate especially a cycloaliphatic diisocyanate. The cycloaliphatic diisocyanates are not adversely affected by ultraviolet light and have high impact energy absorption levels which makes them desirable for bilayer safety glass applications. In addition, polyurethanes prepared with cycloaliphatic diisocyanates are not adversely affected by conventional processing temperatures. Polyurethanes made with analogous aromatic diisocyanates such as toluene diisocyanate and methylene diphenyl diisocyanate do not normally have as good impact energy absorption levels, are subject to ultraviolet light deterioration and also are not as thermally stable as comparable polyurethanes made with cycloaliphatic diisocyanates. The preferred cycloaliphatic diisocyanate is 4,4'-methylene-bis-(cyclohexyl isocyanate). This particular cycloaliphatic diisocyanate is commercially available from E. I. du Pont de Nemours and Company under the trademark HYLENE W.

In addition to the preferred 4,4'-methylene-bis-(cyclohexyl isocyanate), other dinuclear cyclic aliphatic diisocyanates which are preferred are those which are formed through an alkylene group of from 1 to 3 carbon atoms, inclusive, and which can be substituted with nitro, chlorine, alkyl, alkoxy and other groups which are not reactive with hydroxyl groups (or active hydrogens) provided they are not positioned to render the isocyanate group unreactive. Another example of a preferred dinuclear cycloaliphatic diisocyanate is 4,4'-isopropylidene-bis-(cyclohexyl isocyanate). An example of a preferred mononuclear cyclic aliphatic diisocyanate is 1,4-cyclohexyl diisocyanate. Also, hydrogenated aromatic diisocyanates such as hydrogenated toluene diisocyanate may be employed. Dinuclear diisocyanates in which one of the rings is saturated and the other unsaturated can also be employed which are prepared by partially hydrogenating aromatic diisocyanates such as diphenyl methane diisocyanate, diphenyl isopropylidene diisocyanate and diphenylene diisocyanate. Mixtures of cyclic aliphatic diisocyanates with straight chain aliphatic diisocyanates and/or aromatic diisocyanates can also be employed. An example is 4,4'-methylene-bis-(cyclohexyl isocyanate) with commercially available isomer mixtures of toluene diisocyanate or metaphenylene diisocyanate. Thioisocyanates corresponding to the above diisocyanates can be employed as well as mixed compounds containing both an isocyanate and a thioisocyanate group. Diisocyanates which are used herein include thioisocyanates and compounds containing both an isocyanate and a thioisocyanate group.

In addition to the most preferred cyclic aliphatic diisocyanates, straight chain aliphatic diisocyanates such as 1,4-tetramethylene diisocyanate, 1,6-hexamethylene diisocyanate, 1,10-decamethylene diisocyanate, and hexamethylene adipamide diisocyanate can be employed. Suitable aromatic diisocyanates, although not preferred, can be employed and include mononuclear types such as 2,4-toluene diisocyanate, 2,6-toluene diisocyanate, and commercial mixtures comprising 80 percent 2,4-toluene diisocyanate, and 20 percent 2,6-diisocyanate; as well as 65/35 mixtures; and metaphenylene diisocyanate; dinuclear aromatic diisocyanates such as 4,4'-diphenylene diisocyanate and 1,5-naphthalene diisocyanate; halogenated substituted aromatic diisocyanates such as 4-chloro-1,3-phenylene diisocyanate; alkyl substituted diisocyanates such as 3,3'-dimethyl-4,4'-diphenylene diisocyanate, xylene diisocyanates including 1,3-xylene diisocyanates and 1,4-xylene diisocyanate and the durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridge through aliphatic groups such as diphenyl methane diisocyanate and diphenyl isopropylidene diisocyanate; alkoxy substituted aromatic diisocyanates such as dianisidine diisocyanates; mononuclear araalkyl diisocyanates such as xylene diisocyanates and particularly the 70/30 meta, para isomer mixture; aliphatic branched chain diisocyanates such as 2,2,4-trimethylhexa-methylene diisocyanate; an ester containing aliphatic diisocyanates such as 2,6-diisocyanato methyl caproate (Lysine diisocyanate). In addition, the sterically hindered types such as 3,5-diethylmethylene-bis-(4-phenylene isocyanate), 3-isocyanato methyl-3,5,5-trimethylcyclohexyl diisocyanate and 2,6-diethyl-1,4-phenylene diisocyanate in which the two isocyanate groups differ greatly in reactivity can be employed. In addition, diisocyanates can be employed which are bonded from sulfonyl groups such as 1,3-phenylene disulfonyl diisocyanate, and 1,4-xylene disulfonyl diisocyanate.

The polyisocyanates as described above are reacted with at least one compound containing at least two groups which are reactive with the isocyanate or thioisocyanate group. The preferred compounds are those which have at least two, preferably only two, active hydrogen per molecule as determined by the Zerewitinoff test as described by Kohler in *J. Am. Chem. Soc.*, 49, 3181 (1927). Polyols are most preferred.

Suitable polyols include long chain diols such as polyester diols, polycarbonate diols and polyether diols. Representative of the polyether diols are the poly(oxypolymethylene)glycols which include those of the formula:

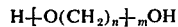

where $n$ is from 3 to 6 and $m$ can be varied considerably, e.g. from 2 to 30 or higher, preferably being between about 6 and about 20. Included are poly(oxytetramethylene) glycols, which are preferred, and poly(oxytrimethylene)glycols, as well as poly(oxypentamethylene) glycols, and poly (oxyhexamethylene) glycols. The poly(oxypolymethylene) glycols should have a number average molecular weight between about 500 and 5000, preferably 500 and about 3500.

The polyethers can be prepared by ring opening and polymerizing cyclic ethers with minor amounts of water. Thus, polytetramethylene glycol ether is prepared by ring opening tetrahydrofuran and polymerizing with minor amounts of water.

The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, glutaric, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The number average molecular weight of the polyester diol prepared from aliphatic diols and carboxylic acids should be between 500 and 5000, preferably 500 and 3500.

Polyester diols can also be made from the polymerization of lactone monomers. Polyester polyols from caprolactone can be prepared by subjecting a lactone represented by the formula:

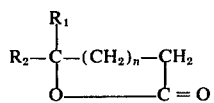

wherein $R_1$ and $R_2$ are each hydrogen or alkyl of 1 to 10 carbon atoms and $n$ is an integer from 1 to 3 to polymerization in the presence of water or minor amounts of a low molecular weight glycol such as ethylene glycol, diethylene glycol, triethylene glycol, 1,4-butanediol, propylene glycol, 1,6-hexanediol, glycerine, etc. The ring opening in polymerization is generally effected at a temperature between 50° and 300°C., and preferably in the presence of the catalyst. Preparation of polycaprolactones is well known in the polyester art. See, for example, German Published Application 1,217,019 and U.S. Pat. No. 3,726,887. Suitable caprolactones include gamma-caprolactone, delta-caprolactone, epsilon-caprolactone, monoalkyl, for example, methyl and ethyl-epsilon-caprolactone, dialkyl, for example, dimethyl and diethyl-epsilon-caprolactones, cyclohexyl-epsilon-caprolactones, etc. The preferred lactone is epsilon-caprolactone.

The number average molecular weight of polyesters prepared from polycaprolactone diols should be between 500 and 5000, preferably between 500 and 3500.

The above-described polyesters can be represented by the following formulas:

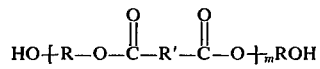

wherein R is an alkylene portion of the glycol used to prepare the polyester, R' is the alkylene portion of the dicarboxylic acid and $m$ is a number that ranges from 0 to 15 or more. Thus, the polyester will be composed of a normal distribution of molecules with a predominant number of molecules represented by those when $m$ varies from 1 to 4.

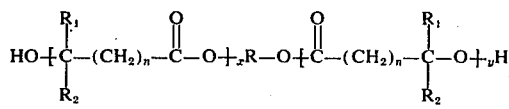

In the second formula presented above which represents polycaprolactones, $n$ is an integer of from 1 to 4, $R_1$ and $R_2$ are each hydrogen or $C_1$–$C_{10}$ alkyl, preferably $C_1$–$C_4$ alkyl, R is the alkylene portion of the glycol used to ring open the lactone and $x$ plus $y$ is a number that ranges from 0 to 30 or more, but $x$ and $y$ are both not simultaneously 0, with a predominant molecular species represented by those wherein $x$ plus $y$ ranges from 1 to 8 and the most predominant being $x$ plus $y$ ranging from 3 to 6.

Besides polyether and polyester diols, poly(alkylenecarbonate) diols such as poly(1,6-hexylenecarbonate) diol can be used.

The preparation of the poly(alkylenecarbonate) diols can be carried out by reacting an aliphatic diol with phosgene, with chloroformic acid ester, with a diaryl carbonate such as diphenyl carbonate, ditolyl carbonate, dinaphthyl carbonate or with a di- lower alkyl carbonate such as dimethyl, diethyl, or di-n-butyl carbonate, either by heating the reactants alone or with the use of an ester interchange catalyst depending on the identity of the reactants. Polycarbonates of different higher molecular weights are obtained depending on the proportions of reactants used. When carbonate ester reagents are used, a calculated quantity of the by product monohydroxy compound is removed by distillation. Suitable alkylene diols include linear aliphatic diols having from 4 to 10 carbon atoms such as 1,4-butanediol, 1,6-hexanediol and 1,10-decanediol, with 1,6-hexanediol being preferred. Poly(alkylenecarbonate) diols having number average molecular weights of from 500 to 5000 are suitable with a 500 to 3500 molecular weight range being preferred. The preferred hexanediol polycarbonate has a number average molecular weight between 1900 to 2100 and is pale wax which has a softening range of 38° to 52°C. depending on the molecular weight. An example of the preparation of suitable polycarbonate diols prepared according to the method of the invention is found in U.S. Pat. Nos. 3,544,524 to Muller, column 3, line 65, to column 4, line 8.

In synthesizing the polyurethanes, chain extension can be accomplished with a compound having two active hydrogens per molecule. The resulting polyurethanes have thermoplastic properties. Preferred chain extenders are aliphatic diols having a molecular weight below 250 and from 2 to 15 carbon atoms such as ethylene glycol, 1,3-propanediol, 1,4-butanediol and 1,6-hexanediol.

The polyurethane can be cured with a compound having more than two active hydrogens per molecule. The resulting polyurethanes have thermosetting properties. Representative curing agents are polyols having at least three hydroxyl groups; such as trimethylolpropane, trimethylolheptane, pentaerythritol and castor oil. Also suitable are mixed curing agents such as polyols having three hydroxyl groups in conjunction with a low molecular weight diol such as ethylene glycol and 1,4-butanediol. The polyols can also be mixed with polyamines having 2, 3, 4, 5, 6 or more reactive amine groups. Suitable polyamines are aromatic amines such as 4,4'-methylene-bis(2-chloroaniline) and diamino diphenyl sulfone.

Preferably the polyurethane reaction is carried out in the presence of catalyst. Catalyst has been found to give shorter cure times at lower temperatures and to insure for the complete reaction resulting in a cured polymer being essentially free of unreacted NCO groups. Suitable urethane-forming catalysts are those that are specific for the formation of the urethane structure by the reaction of the NCO group of the diisocyanate and the active hydrogen-containing compound and which have little tendency to induce side reactions. For these reasons, catalyst such as stannous salts of organic acids and organo tin compounds are preferred. Illustrative catalyst include stannous octoate, stannous oleate, dibutyl tin diacetate, butyl stannoic acid and dibutyl tin dilaurate. The amount of catalyst used in any particular system should be determined empirically and will be governed as has been mentioned above by the types and amounts of adhesion-controlling additives which are present in the formulation. In general, amounts of from about 5 to 500 parts per weight of catalyst per million parts of polyurethane-forming ingredients can be used. Catalysts other than the preferred tin catalysts which are useful for the formation of urethanes can be used.

The urethanes for the laminates of the invention can be prepared in several ways. The prepolymer method offers selective control of the polymerization steps. By this method, the long chain diol such as the polyester diol, is first reacted with an excess of diisocyanate to give an intermediate molecular weight adduct or "prepolymer". The prepolymer can then be polymerized (chain-extended) with glycols, diamines or other active hydrogen compounds.

In addition to the prepolymer route where the reaction of isocyanate with long chain diol is completed before the relatively low molecular weight active hydrogen compound, sometimes referred to as the curing agent, is added, all components may be mixed simultaneously in a so-called "one-step" process. This method is generally satisfactory when all active hydrogens react at about the same rate. However, when the active hydrogen compounds react at different rates, such as when the long chain diol and curing agent are of greatly different molecular weights, e.g. poly(1,4-butylene adipate) diol which has a molecular weight of 2500 and 1,4-butanediol which has a molecular weight of 90, a catalyst should be added to catalyze the reaction of the higher molecular weight compound. Particularly useful catalysts are the tin catalysts mentioned above such as dibutyl tin dilaurate and stannous octoate, and butyl stannoic acid catalyst.

For optimum results, the water content of the hydroxyl-terminated reactants should be as low as possible and the isocyanate reaction should generally be conducted under anhydrous conditions with dry reactants, such as in a nitrogen atmosphere, at atmospheric pressure and at a temperature of between about 43°C. and about 100°C. The reaction is conducted until there is essentially no free isocyanate or hydroxyl groups, (i.e., less than about 0.6 percent and preferably less than 0.3 percent by weight NCO).

The processing conditions which may be used and the final polymer properties will also govern the choice of curing agent. When the prepolymer method is employed, the prepolymer is preferably heated to a temperature which will be above the melting point of the curing agent and which will reduce the prepolymer viscosity to a few hundred or at most a few thousand centipoises so as to aid in mixing and prevent solidification of the curing agent. The curing agent is usually heated above its melting point also. The mixing of the prepolymer with curing agent is a critical step and the agitation should be excellent.

Similar or superior results can be obtained by the "one-step" method if the exotherm is properly controlled.

The ratio of reactants can vary depending upon the materials employed and the intended use of the urethane but preferably the total number of labile or active hydrogen atoms is approximately equivalent to the number of isocyanate groups. The NCO to active or labile hydrogen ratio is generally from between about 0.9 and about 1.1, preferably between about 0.97 and about 1.03.

After reaction is complete, the solid polymer can be chopped and transferred to an extruder and extruded and/or milled and calendered to the desired thickness. Alternately, a liquid partially polymerized material can be transferred to an extruder and further polymerized in the forming equipment. Conventional rubber mills, extruders and rotational casting apparatus can be employed to form the polymer into sheet form. The material is then preferably sandwiched between a nonadherent protecting material such as polyethylene to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in the polymer such as by drying in an oven at a temperature of between about room temperature and about 120°F. for from a few hours up to about 3 days or more. Before lamination, the powder, if employed, can be removed in a water bath and the sheet dried. The polyurethane can then be placed with other materials to form the desired laminate.

The preferred urethanes generally have inherent viscosities at 30°C. in 0.5 percent solution of silica stabilized chloroform or N-methyl-2-pyrrolidone of between about 0.60 and 1.40, and preferably between about 0.8 and about 1.3.

The preferred polyurethanes of the invention will generally have a number average molecular weight as estimated from inherent viscosity measurements between about 10,000 and about 100,000 and preferably between about 20,000 and 65,000.

The preferred polyurethane compositions, i.e., the polyurethanes plus adhesion modifiers and other additives such as catalyst which may be present in the formulation will be used in the form of thin energy absorbing sheets or layers laminated on at least one of its major surfaces to a glass sheet. For good energy absorption, such as high mean penetration velocities, the polyurethane composition should have a range of certain properties. The physical properties which are considered to be important for energy absorption include modulus, tensile strength, flexibility and toughness. The polyurethane compositions of the present invention have a relatively constant Gehman modulus between −20° and 50°C. of $10^7$ and $10^{9.5}$ dynes per square centimeter as determined by A.S.T.M. D-1053-65T. The tensile strength of the compositions should be at least 1000 pounds per square inch (psi) and preferably 2000 to 10,000 psi and the ultimate elongation at the break (a measure of flexibility) should be about 300 to 1,000 percent as measured by A.S.T.M. D-638-64T. The toughness of the polyurethane composition can be measured by the abrasion resistance according to ANSI Code Z-26.1 Test No. 18 for plastics and accordingly, the abrasion resistance should be no more than 15 percent increase in haze after 100 Taber cycles on a Taber abrader.

The thickness of the polyurethane layer adhered to the glass sheet should be thin and can vary depending on the ultimate use. Typically, the polyurethane layer will vary between 5 and 120 mils or more. In case of automobile and other vehicle windshields, the polyurethane layer will vary between 15 and about 60 mils. The polyurethane layer should be of substantially uniform thickness across its entire expanse to avoid differences in diffraction. The thickness variation from edge to edge should be no more than ±5 mils, preferably no more than ±2 mils. Moreover, the rate of change in thickness within the layer should be sufficiently small to produce a diopter of less than 0.006 to avoid visible optical distortion in the resultant laminate due to variations in refraction. Other optical properties of the polyurethane layer such as light transmission take on significance when the polyurethane is in the laminated form. The free layer or sheet of polyurethane may be somewhat hazy but upon lamination, they become optically clear. The light transmitting properties of the polyurethane laminates of the present invention are discussed below. Thus, in the specification and claims where a transparent polyurethane layer is specified, the polyurethane layer in the laminated form such as laminated to glass is intended.

The glass which can be employed to prepare the bilayer safety glass laminates of the invention can be any type depending upon the intended use of the laminate, but preferably is a clear, low-colored, transparent type of glass such as the well-known silica type of glass, particularly soda-lime-silica glass. The nature and composition of various silica glasses is well known in the art and is described, for example, in the *Encyclopedia of Chemical Technology*, by Kirk-Othmer, published by Interscience Encyclopedia Inc., New York, N.Y., volume 7, pages 181–189. The glass can be strengthened by either thermal or chemical tempering as is well known in the art.

The thickness of the glass can vary depending on the ultimate use. Typically, the glass can have a thickness of from 50 to 500 mils. For automobile and other vehicle windshields, the glass will preferably have a thickness of between 65 to 180 mils.

To fabricate safety glass laminates of the invention, laminating can be conducted with a preformed polyurethane sheet or with the reactive ingredients. Laminating with a preformed plastic sheet is conducted in two stages, a first "prepressing" stage and a second "autoclaving" stage. The prepressing stage can be performed using rubber tubing edge channels as described in U.S. Pat. No. 2,948,645. In this method, a matching pair of thin glass sheets are assembled with the preformed polyurethane sheet therebetween to form a sandwich structure. The sheets of glass can either be annealed or tempered. To fabricate a bilayer laminate, the interior surface of one of the glass plates is coated with a release agent which will permit the polyurethane interlayer material to release easily from the glass upon completion of the lamination. The release material must be able to withstand the temperatures and pressures of the subsequent laminating operation and should be substantially inert in relation to the plastic interlayer material. Examples of release agents are polyvinyl fluoride, fluorinated ethylene-propylene copolymers and polytetrafluoroethylene, the latter being commercially available from E. I. du Pont de Nemours and Company under the trademark TEFLON. After the sandwich structure has been assembled, the rubber tubing is fitted around the marginal edge of the sandwich and connected to a vacuum source. The prepressing operation is performed at a temperature of about 225°F. to 300°F. for about 10 to 15 minutes using a vacuum of about 26 to 28 inches of mercury. This prepressing operation removes all the air between the plies of glass, the plastic interlayer material and the release material, thus permitting subsequent lamination to take place without the development of air bubbles at the glass-polyurethane surface. Another method of "prepressing" involves using modification of the so-called "vacuum bag techniques" as generally described in U.S. Pat. No. 3,311,517. In this method, the sandwich construction is placed in a plastic bag, for example a silicone rubber bag, which is inserted in an oven. With the exception of an air exhaust valve, the bag is then sealed to form an air-tight closure. The bag is evacuated through the air exhaust valve for about 5 minutes at a vacuum of about 26 to 28 inches of mercury. Temperature of the oven is then increased to about 300°F. and the temperature and vacuum held from 7 to 10 minutes to prepress the samples.

After most of the air has been removed from the glass-plastic innerface by prepressing, the prepressed glass-plastic-glass sandwiches are then passed into an oil autoclave or other suitable high pressure equipment and heated to a temperature of about 250°F. to 375°F. and at a pressure between 50 and 500 pounds per square inch for about 5 to 10 minutes to laminate the sandwich. The temperature of the oil is then reduced to about 150°F., the pressure is released and the sandwich sample removed from the autoclave.

The polyurethane formulation can also be adhered or laminated to the glass by casting it as a liquid prepolymer against the glass surface and curing the polyurethane in place against the glass. It has been found that when the glass-plastic bilayer is prepared in this manner, a particularly strong bond is effected at the glass-plastic interface. The casting and curing-in-place technique essentially involves pouring or pumping uncured or partially cured resinous polyurethane material into a glass casting cell which consists of two spaced-apart glass sheets. If a motor vehicle windshield is to be fabricated, the glass sheets are bent and matched to one another. Glass bending matched pairs of glass sheets is well known in the art and can be done by the gravity-sagging technique as described in U.S. Pat. No. 3,248,196 and also by the "press bending" technique as described in U.S. Pat. No. 3,136,618. The matched pairs of bent glass sheets are held in a spaced-apart relationship by an adhesive-spacer element which is positioned between and around the perimeter of the glass sheets. A suitable spacer-adhesive element is, for example, a ¼ inch wide strip of 10 to 75 mils thick foam polyurethane tape which is commercially available from the Minnesota Mining Manufacturing Company. The thickness of the foam tape will determine the thickness of the interplastic ply and thicker and thinner tapes are commercially available. The foam tape strip is continuous except where it is tightly butt-joined at the four corners of the windshield and except for about a 4 to 8 inch wide space near the center of one of the longer windshield edges which is devoid of foam tape to provide an opening for filling the casting cell with liquid resin. The foam polyurethane tape is an open cell foam and allows the air from the interior space of the cell to exit at any point along the edge while the cell is filling, but does not allow passage of any liquid resin.

To fabricate a bilayer laminate, one interior surface of the casting cell should be coated with a release agent so that after the resinous interlayer material has been cast and cured in place, the glass sheet with the release surface can be easily separated from the cured interlayer material. For a bilayer windshield, this should be the concave interior surface. It should be noted that at this point instead of a glass back-up plate coated with a release agent, the casting cell could be made with a solid release material such as a smooth, metal element. However, because the casting and curing operation is conducted at elevated temperatures, it is desirous to construct both major walls of the casting cell with a material which has the same thermal coefficient of expansion so as to minimize advantage of inducing any optical distortion into the plastic interlayer material. Also, because thickness uniformity of the interlayer material is particularly critical in windshield applications, it is desirous to construct the casting cell from two matched windshield elements which have been bent at matched fashion on a bending roll as described above. Thus, the glass back-up plate with a release material coated on it is preferred to a polished metal plate. The release material should, of course, be inert to the resinous interlayer material and should be able to withstand temperature of casting and curing in place. Further, it should permit easy separation of the glass back-up plate from the cured interlayer material. Suitable release agents for casting and curing in place include the fluoro compounds mentioned above as release material for laminating preformed poly(carbonate-urethane) sheet.

Casting may be accomplished by merely pouring the resin into the cell, but preferably casting is accomplished by pumping a metered quantity of liquid resin into the interlayer space. After the resinous interlayer has been cast, the windshield cell is sealed and the resin is permitted to cure in place. The time and temperature of cure will be from about 230° to 290°F. for a time of about 24 hours. If a catalyst is present in the polyurethane, the cure time can be significantly reduced from 24 to about 6 to 8 hours.

Safety glass laminates of the present invention provide good visibility and have good optical properties, thereby having utilitity in window-type applications, for example, as automobile and other vehicle windshields, and side and backlites. Such laminates will meet the standard requirements of minimum light transmission of 70 percent, usually 86.5 percent or more (Illuminant A, Tungsten Lamp 2840°K) and less than 2 percent haze (ANSI Code Z-26.1, 1966, Test No. 18). Laminates of the present invention will also have a maximum light transmission loss of no more than 2.3 percent for every 0.1 inch thickness of the laminate. With such good visibility and optical properties, the laminates of the invention can also be used for architectural purposes such as building windows.

The degree of adhesion between the polyurethane and the glass ply in the bilayer laminates of the invention is extremely critical and should be about 1 to 10 pounds per lineal inch, preferably 3 to 7 pounds per lineal inch as determined by a 90° Peel Test according to NASA TECH BRIEF 65-10173. This adhesion is low enough to allow sufficient interlayer to release from the glass so that it can stretch without tearing to absorb impacting energy, yet the degree of adhesion is sufficient for retention of broken glass. Higher degrees of adhesion, that is, much higher than 10 pounds per lineal inch, result in decreases in impact resistance and higher Severity Indices which are described later. Lower degrees of adhesion, that is, lower than 1 pound per lineal inch, are insufficient for commercial vehicle use in that they may delaminate while in use, particularly under higher humidity conditions. In addition to a low initial degree of adhesion within the prescribed range, this degree of adhesion should be relatively stable under a wide range of temperature and humidity conditions. By relatively stable under a wide range of temperature and humidity conditions is meant that although there may be fluctuations in the adhesion value over a period of time, the degree of adhesion remains within the 1 to 10, preferably within the 3 to 7, pound per lineal inch range under temperatures ranging from −50° to 120°F. and relative humidities ranging from 0 to 100 percent for at least 5 days. It has been found that any changes from the initial usually occur during the first day or two after lamination.

Since the degree of adhesion between the polyurethane and glass is most sensitive (that is, most likely to delaminate) to high humidity and temperature conditions, exposure of the laminate to high temperature and humidity conditions and measuring the degree of adhesion of polyurethane to glass as a function of time is a good indication of adhesion stability. Accordingly, when the bilayer laminates of the invention are exposed to an environment of 100 percent relative humidity and 120°F., the degree of adhesion should remain within the 1 to 10, preferably within the 3 to 7, pound per lineal inch range for at least 5 days (120 hours) and preferably for 30 days, although there may be some variation from the initial adhesion value before exposure. Since a 120°F./100 percent relative humidity are severe exposure conditions, much more severe with regards to bilayer laminate adhesion stability than are lower combinations of temperature and humidity, the above type of testing is considered to be a good indication of whether the bilayer laminates of the invention will maintain their glass-polyurethane adhesion under a wide range of humidity and temperature conditions. Also, since it is most unlikely that a bilayer motor vehicle laminate will be subjected to such severe conditions as 120°F. and 100 percent relative humidity for extended period of time, the 5 and 30-day testing duration seem reasonable test durations. It has been found that if a laminate will fail, it usually fails within 1 or 2 days and if it passes 5 days at 120°F./100 percent relative humidity with stable adhesion, it will maintain stable adhesion indefinitely.

The safety glass laminates of the present invention have excellent resistance to impact properties over a wide temperature range. For example, when an approximately 0.030–0.040 inch thick polyurethane layer is laminated to a ⅛ inch thick 12 inch by 12 inch float glass sheet to form a bilayer laminate, and the laminate is held rigid and impacted on the polyurethane side with a 5-pound freely falling steel ball, as described in more detail below, the mean penetration velocity of the laminate at 0°F., 70°F. and 120°F. will be at least 20 miles per hour (mph). At 70°F., the mean penetration will be at least 30, and preferably at least 38 mph.

The invention has particular pertinence to bilayer laminates comprising one layer or sheet of glass laminated to one layer of polyurethane, however, it should be appreciated that the invention is also applicable to trilayer laminates comprising a polyurethane layer sandwiched between two plies of glass or sandwiched between a layer of glass and other rigid transparent material such as polycarbonate or acrylic. Also, the invention applies to complex laminate units consisting of a glass-polyurethane laminate assembly further adhered to other plastic sheet material such as polyvinyl butyral, acrylic, polycarbonate and polyurethane free of adhesion modifiers. The other plastic sheet material can be adhered to either the exposed glass or polyurethane surface, whichever is desired and possible.

In discussing the properties of the glass laminates described in the following examples, reference will be made to several test procedures employed to evaluate adhesion of the polyurethane ply to the glass ply and to measure the resistance of the laminate to penetration by impacting objects. Such tests are described below.

A test for measuring the adhesion of the safety glass innerliner materials to the glass is the 90° Peel Test. The 90° Peel Test measures the peel resistance of the glass-polyurethane adhesive bond by the method described in NASA TECH BRIEF NO. 65-10173 entitled "Peel Resistance of Adhesive Bonds Accurately Measured." The testing apparatus in this test procedure consists of a series of movable rollers or supports which allow the test specimen to be peeled at a constant 90° angle along its entire uncut length. The apparatus consists of a series of five 1.000 ± 0.005 inch rollers which are geometrically affixed to two side supports and a base plate. The two lower rollers are adjustable so that the apparatus can easily accommodate test specimens varying in thickness from ⅛ to 1 inch. A suitable top clamp is used for securing the plastic layer.

The test specimen should be at least 10 inches in length and 2 inches in width, and should be prepared so that at least 2 inches and not more than 3½ inches of the plastic layer is completely released from the glass layer at either end of the length. This may be accomplished prior to the testing by insuring that a portion of the test specimen remains unbonded.

At least 6 specimens, 2 or more from each of 3 bonded panels, should be tested for each adhesive sample.

In the actual testing procedure, the fixture is affixed to the movable head of the testing machine in a position which will cause the peeled plastic layer to form a 90° angle with the test specimen during the test. The test specimen should be positioned in the fixture and the free skin clamped securely. The clamp is then pinned to the top head of the testing machine. With no load on the test specimen, the weighing apparatus is then balanced to zero. Provision should be made to autograph the peel load versus displacement of the head for a peel distance of at least 6 inches.

The maximum load obtained during any one specimen test should be at least 10 percent of the full scale value. A minimum of 6 inches of facing should be peeled from the honeycomb sandwich at a testing machine head speed of 4.00 ± 0.01 inch per minute.

Neglecting the first inch of peel, the load required to peel the plastic layer shall be taken from the autographic curve. The peel strength is then calculated as follows:

$$P = \frac{\text{peeling load (pounds)}}{\text{width of specimen (inches)}}$$

It has also been found that the 90° peel resistance of the glass-polyurethane adhesive bond can be determined by a Chatillon hand tester. This tester is manufactured by John Chatillon and Son, Model DPP-25, Serial No. 6671. The instrument is described in some detail in U.S. Pat. No. 3,165,925. It has been found in a series of comparative tests in measuring low degrees of adhesion of the polyurethane to glass, as accomplished by the invention, that is, on the order of about 1 to 10 pounds per lineal inch, a 90° Peel Test employing the Chatillon hand tester and the 90° Peel Test according to NASA TECH BRIEF 65-10173 gave equivalent results. Therefore, where the adhesion of the polyurethane to the glass is mentioned in the specification and claims, the peel resistance of the glass-polyurethane adhesive bond as determined by the method described in the NASA TECH BRIEF 65-10173 is meant.

A method of determining the impact resistance of safety glass laminates is known as the 5-pound ball drop impact test. Reference is made to ANSI Code Z-26.1, 1966, for a discussion of this test. In this test, a set of 10 12-inch-square laminates consisting of one piece of ⅛ inch thick flat glass and a 40-mil sheet of innerlayer material to be tested is prepared in the appropriate fashion, that is, by the method for preparing safety glass laminates as described in the working examples. Each laminate is in turn laid on a horizontal steel frame which supports it by the outer ⅜ inch along all four edges. A 5-pound solid steel ball is then dropped on the supporting laminate, on the urethane side, so that it strikes within 1 inch of center. If the ball does not pass through the laminate, the result is considered a support. The drop height is increased or decreased 1 foot for the next laminate according to whether the test laminate is graded respectively a support or a failure. Testing is continued until the ball has been dropped on all 10 laminates and the 50 percent support height is calculated by the well-known "staircase" method. The velocity of the ball drop from the 50 percent support height is readily calculated at the point of impact by reference to the well-known constant of the acceleration due to gravity.

The 22-pound falling headform test can also be used to calculate impact resistance and a factor known as the Severity Index. In the 22-pound falling headform test, the headform is dropped from predetermined heights onto a rigidly held laminate in much the same manner as the 5-pound ball impact test. The measurement of the deceleration forces on the headform upon impact is determined by a linear accelerometer mounted in the headform. The vertical deceleration forces in "g's" (32 feet per second per second) are measured as a function of time. The measurements are plotted graphically with deceleration forces being plotted as the ordinate and the time in milliseconds being plotted as the abscissa. The Severity Index (S.I.) is calculated by the Danforth-Gadd equation:

$$S.I. = \int_o^t g^{2.5} dt$$

wherein $g$ is the acceleration in units of gravity, $t$ equals time and $dt$ is the time differential in milliseconds between the moment of impact of the headform with the test laminate to the time the accelerometer mounted in the headform indicates a sudden negative load. This value is determined for each millisecond during the time interval and the values integrated for the whole time period. In other words, the Severity Index is calculated from the area under a curve resulting from a plot of acceleration forces acting on the dummy's head as a function of time. A Severity Index of 1000 has been suggested as the injury threshold for head impacts. In general, the Severity Index increases with the velocity of impact.

For a more thorough description of Severity Index, see "Human Tolerance to Impact Conditions as Related to Motor Vehicle Design" by the Society of Automotive Engineers Handbook Supplement J885, 1964; and "Use of a Weighted-Impulse Criteria for Estimating Injury Hazard" by J. P. Danforth and C. W. Gadd from the conference proceedings 10th Stapp Car Crash Conference, reprinted by the Society for Automotive Engineers, December 1966. Also, see "Laboratory Studies on Laminated Safety Glass and Installations on Performance" by R. G. Rieser and J. Chabal presented at the 13th Stapp Car Crash Conference, reprinted by the Society for Automotive Engineers, December 1969.

The present invention is more particularly described in the following examples which are intended as illustrative only since numerous modifications and variations therein will be apparent to those skilled in the art.

EXAMPLE I

A polyurethane composition, and a safety glass laminate employing such composition, was prepared as follows:

| Ingredient | |
| --- | --- |
| 4,4-methylene-bis-(cyclohexyl isocyanate) (HYLENE W, registered trademark of E.I. du Pont de Nemours) | 50 mole percent[1] |
| poly(1,4-butylene adipate) diol[2] (M.W. 530) | 50 mole percent[1] |
| butyl stannoic acid catalyst | 200 parts per million[3] |
| gamma-glycidoxy-propyltrimethoxysilane (Dow Corning's Z-6040) | 0.20 percent[4] |
| stearyl acid phosphate | 0.03 percent[4] |

[1]Based on total moles of HYLENE W and poly(1,4-butylene adipate) diol.
[2]The poly(1,4-butylene adipate) diol was prepared by esterifying 14.5 moles of 1,4-butanediol and 10 moles of adipic acid in the presence of 200 parts per million butyl stannoic acid catalyst. The polyester had a hydroxyl number of 192 and a number average molecular weight of about 530.
[3]Based on weight of poly(1,4-butylene adipate) diol.
[4]Based on total formulation weight.

The poly(1,4-butylene adipate) diol containing the butyl stannoic acid catalyst was melted (melting point about 140°F.), mixed with a gamma-glycidoxy-propyl-trimethoxysilane and the mixture charged to a glass reaction kettle. The ingredients in the reaction kettle were kept at a temperature of 140°F. for 30 minutes under 2–3 millimeters of mercury pressure to degas the mixture and to remove trace amounts of water. The temperature was permitted to drop to 110°F. and the vacuum was released by introducing pre-purified nitrogen. The 4,4'-methylene-bis-(cyclohexyl isocyanate) in a stereoisomer ratio of 55 percent trans and 45 percent cis and at a temperature of 110°F. and containing the stearyl acid phosphate was added to the reaction kettle with mixing. The mixture was degassed for 6 to 10 minutes while holding the temperature at about 110°F. and at a pressure of about 2 millimeters of mercury. The vacuum was then broken by introducing pre-purified nitrogen into the reaction kettle and the degassed mixture was cast and cured in glass cells to form a sheet somewhat as follows:

The polyurethane was cast in place between two 14 inch by 14 inch by ⅛ inch float glass sheets which are fitted with gaskets on three sides. Both glass sheets had polytetrafluoroethylene release coatings on their faces which contacted the polyurethane. The spacing between the sheets was 40 mils. The casting cell was preheated to a temperature of about 290°F. before casting and the cast assemblies were given a 7-hour cure at 290°F. After curing for this period and temperature, the cells were permitted to cool to room temperature. The polyurethane sheet was then removed from the casting cell and then aged 1 week at 70°F. and atmospheric pressure. The cured polyurethane was essentially free of NCO and had a urethane content calculated to be 14.8 percent. The polyurethane sheet was trimmed, then placed on a 12 inch by 12 inch by ⅛ inch float glass sheet and a piece of TEDLAR (registered trademark of E. I. du Pont de Nemours and Company) film was placed over the polyurethane and a 12 inch by 12 inch by ⅛ inch float glass sheet was placed over the TEDLAR film. The assembly was then placed in a MYLAR (registered trademark of E. I. du Pont de Nemours and Company) bag and the bag and its contents placed in an evacuation chamber and evacuated at approximately 40 millimeters of mercury at room temperature to prepress the assembly. The vacuum bag assembly was then placed in an oil autoclave for 45 minutes at 300°F. and 200 pounds per square inch to laminate the assembly. After autoclaving, the assembly was broken apart to yield a 12 inch by 12 inch bilayer laminate. The 12 inch by 12 inch bilayer laminates were then subjected to a 5-pound falling ball test as described above to determine the penetration resistance of the laminate structure. The test results are given below for a polyurethane thickness of 40 mils.

| 0°F. | 70°F. | 120°F. |
|---|---|---|
| 25 miles per hour (mph) | greater than 38 mph* | 21 mph |

*The limit of the testing apparatus employed was 38 mph.

Two foot by 3 foot bilayer laminates employing the above-described polyurethane were prepared as follows: Instead of casting the liqid polyurethane in 12 inch by 12 inch casting cells, the polyurethane was cast between four sets of two each 14 inch by 14 inch by ¼ inch float glass sheets, both sheets of which had a polytetrafluoroethylene release coating on their surfaces which contacted the polyurethane. The spacing between the sheets was approximately 40 mils. The four casting cells were preheated to 290°F. immediately before the polyurethane was cast. After casting, the polyurethane was given a cure of 7 hours at 290°F., followed by cooling to room temperature and aging for 1 week at 70°F. and one atmospheric pressure. The polyurethane sheets were then removed from the casting cells and the sheets were pieced together on a 2 foot by 3 foot by 90 mil float glass sheet. A piece of TEDLAR film was placed over the polyurethane sheets and then a 2 foot by 3 foot by 90 mil float glass sheet was placed over the TEDLAR film. This assembly was then placed in a MYLAR bag and the bag and its contents placed in an evacuation chamber and evacuated at approximately 40 millimeters of mercury at room temperature to prepress the assembly. The vacuum bag assembly was then placed in an oil autoclave for 45 minutes at 300°F. and 200 pounds per square inch to laminate the assembly. After autoclaving, the assemblies were broken apart to yield 2 foot by 3 foot bilayer laminates. The bilayers were stored 5 to 7 days in a controlled humidity room to 70°F. and approximately 25 percent relative humidity and then given 22-pound falling headform impact testing as described above. Testing was conducted at 30°F., 70°F. and 110°F. at 19 miles per hour. At all three temperatures, the falling headform did not penetrate the laminate and the polyurethane layer did not tear.

The Severity Index results for 2 foot by 3 foot bilayer laminates prepared as described above at an impact speed of 19 miles per hour were as follows:

| 30°F. | 70°F. | 110°F. |
|---|---|---|
| 276 | 159 | 106 |

The adhesion of the polyurethane to glass when laminated under the above conditions was about 5 pounds per lineal inch as determined by a 90° Peel Test with a Chatillon hand tester manufactured by John Chatillon and Son, Model DPP-25, Serial No. 6671. See also U.S. Pat. No. 3,165,925. When the adhesion was evaluated according to NASA TECH BRIEF 65-10173, the 90° peel strength was also measured at about 5 pounds per lineal inch. When a bilayer laminate prepared as described above was put in the high humidity chamber at 100 percent relative humidity at 120°F., the degree of adhesion between the polyurethane and the glass was unchanged after 30 days.

As a comparison, a series of bilayer laminates were prepared as described above with the exception that the stearyl acid phosphate was not present in the formulation. The adhesion of thepolyurethane to glass was very high, on the order of 40 pounds per lineal inch or higher.

When 2 foot by 3 foot bilayer laminates were impacted with a 22-pound falling headform as described above, there was no penetration of the laminate nor tear of the polyurethane at 30°F. and 70°F. but the 22-pound falling headform penetrated at 110°F.

The Severity Index results for 2 foot by 3 foot bilayer laminates prepared as described above at an impact speed of 19 mph were as follows:

| 30°F. | 70°F. | 110°F. |
|---|---|---|
| 356 | 193 | penetrated (no value) |

As a further comparison, a bilayer laminate was prepared as generally described above with the exception that the gamma-glycidoxy-propyltrimethoxysilane was excluded from the formulation. There was essentially no adhesion of the polyurethane to the glass and the sample completely delaminated after a few hours exposure to 100 percent relative humidity and 120°F.

As a further comparison, a bilayer laminate was prepared as generally described above with the exception that no silane or organic phosphorus ester were used in the formulation. Although the initial degree of adhesion of the polyurethane to glass was about 5 to 6 pounds per lineal inch, this initial degree of adhesion was not maintained upon exposure to 100 percent relative humidity and 120°F. The sample completely delaminated in a few hours. Also, the sample delaminated upon exposure to ambient conditions, i.e. 75°F., 50 percent relative humidity. On the other hand, the laminates prepared according to this invention were stable indefinitely, i.e. did not delaminate upon exposure to these same conditions.

EXAMPLE II

A second polyurethane composition and a safety glass laminate employing such composition was prepared as follows:

| Ingredient | |
|---|---|
| 4,4'-methylene-bis(cyclohexyl isocyanate) (HYLENE W) | 3.140 moles |
| poly(1,6-hexylenecarbonate) diol (M.W. 2043) | 1.00 mole |
| 1,4-butanediol | 2.094 moles |
| poly(1,4-butylene adipate) diol (M.W. 530) containing 1 percent by weight of butyl stannoic acid catalyst based on weight of poly (1,4-butylene adipate) diol | 0.046 mole |
| gamma-glycidoxy-propyltrimethoxysilane (Dow Corning's Z-6040) | 0.20 percent by weight |
| stearyl acid phosphate | 0.12 percent by weight |

Melted poly(1,6-hexylenecarbonate) diol which is commercially available from Farbenfabriken Bayer Aktiengesellschaft of Leverkusen, Germany, sold under the trademark DESMOPHEN 2020, and melted catalyst solution containing the butyl stannoic acid catalyst and the gamma-glycidoxy-propyltrimethoxysilane were charged to a glass reaction kettle. The polycarbonate diol had an average molecular weight of 2043 and was a pale wax having a softening point of 104°F. The ingredients in the reaction kettle were heated at a temperature of 176°F. while maintaining the mixture as a liquid. Heating was continued for 30 minutes under 2 millimeters of mercury pressure to remove trace amounts of water and to degas the mixture. The pressure was released by introducing pre-purified nitrogen. Next, anhydrous 1,4-butanediol at approximately 176°F. was added while still stirring which caused the temperature to drop to 171°F. Immediately following this, 4,4'-methylene-bis-(cyclohexyl isocyanate) (HYLENE W) in a stereoisomer ratio of 55 percent trans and 45 percent cis at 176°F. and containing the stearyl acid phosphate was added to the reaction ketle while stirring. The mixture was then degassed for 8 minutes while holding the temperature at about 171°F. and the pressure at about 2 millimeters of mercury.

The cast sheets of this formulation were then prepared as described in Example I to provide 12 inch by 12 inch bilayer laminates. The urethane content of the poly(hexylenecarbonate-urethane) was calculated to be 12.83 percent. The bilayer laminates had the following impact properties:

| | Mean Penetration Velocity (5-pound ball drop) | |
|---|---|---|
| 0°F. | 70°F. | 120°F. |
| 24.5 miles per hour (mph) | greater than 38 mph | 25 mph |

When 2 foot by 3 foot bilayer laminates were impacted with a 22-pound falling headform as described in Example I, there was no penetration of the laminate nor tear of the polyurethane layer at 30°F., 70°F. and 110°F. at 19 miles per hour.

The Severity Index results from 2 foot by 3 foot bilayer laminates prepared as described above at an impact speed of 19 mph were as follows:

| 30°F. | 85°F. | 110°F. |
|---|---|---|
| 396 | 205 | 156 |

The adhesion of the polyurethane to glass when laminated under the above conditions was about 4–6 pounds per lineal inch as determined by the 90° Peel Test according to both NASA TECH BRIEF 65-10173 and a hand measurement using a Chatillon hand tester. When a bilayer laminate is prepared as described above and put in a high humidity chamber at 100 percent relative humidity, 120°F., the degree of adhesion between the polyurethane and the glass was unchanged after 30 days.

In comparison, when a series of bilayer laminates were prepared as described above in Example II, with the exception that no stearyl acid phosphate was present in the polyurethane formulation, the degree of adhesion of the polyurethane to the glass was very high, on the order of 40 pounds per lineal inch as determined by the 90° Peel Test.

When 2 foot by 3 foot bilayer laminates were impacted with a 22-pound falling headform, such as described in Example I, there was no penetration of the laminate at 30°F. but there was a 7-inch tear of the polyurethane. Also, there was penetration and tear of the laminate at 70°F. and 110°F.

When the polyurethane composition of Example II was prepared with no silane, there was essentially no adhesion between the polyurethane and the glass. When the bilayer sample was subjected to 100 percent relative humidity at 120°F., the sample completely delaminated in a matter of hours.

EXAMPLE III

A third polyurethane was prepared from the following charge:

| Ingredient | |
|---|---|
| 4,4'-methylene-bis-(cyclohexyl isocyanate) (HYLENE W) | 3.736 moles |
| poly(1,4-butylene adipate) diol (M.W. 1990, OH number 57.1) | 1 mole |
| 1,4-butanediol | 2.736 moles |
| butyl stannoic acid catalyst | 50 parts per million by weight[1] |
| gamma-glycidoxy-propyltrimethoxysilane (Dow Corning's Z-6040) | 0.20 percent by weight[2] |
| stearyl acid phosphate | 0.05 percent by weight[2] |

[1] Based on total formulation weight.
[2] Based on total formulation weight.

The melted poly(1,4-butylene adipate) diol, containing the butyl stannoic acid catalyst and the gamma-glycidoxy-propyltrimethoxysilane were charged to a glass reaction kettle. The ingredients in the reaction kettle were heated to a temperature of 170°F. while maintaining the mixture as a liquid. Heating was continued for 30 minutes under 2 millimeters of mercury pressure to degas the mixture and remove trace amounts of water. The pressure was released by introducing pre-purified nitrogen. Anhydrous 1,4-butanediol at approximately 170°F. was added while still stirring. This caused the temperature to drop to about 165°F. Immediately following, 4,4'-methylene-bis-(cyclohexyl isocyanate) (HYLENE W) in a stereoisomer ratio of 55 percent trans and 45 percent cis and containing the stearyl acid phosphate was added to the reaction mixture while still stirring. The mixture was then degassed for about 8 minutes while holding the temperature at about 165°F. and at a pressure of about 2 millimeters of mercury whereupon the vacuum was broken with dry nitrogen and the degassed mixture cast into glass cells as described in Example I to give eventually bilayer laminates.

The adhesion of the polyurethane to glass when laminated under the above conditions was about 4 to 6 pounds per lineal inch as determined by a 90° Peel Test both according to NASA TECH BRIEF 65-10173 and by a Chatillon hand tester. When a bilayer laminate prepared as described above was put in a high humidity chamber at 100 percent relative humidity at 120°F., the degree of adhesion between the polyurethane and the glass remains essentially unchanged after 30 days.

EXAMPLE IV

A polyurethane composition such as described in Example I was prepared with 0.05 percent by weight lauryl acid phosphate used instead of the 0.03 percent by weight stearyl acid phosphate. The procedure of Example I was generally followed with the exception that the lauryl acid phosphate was predissolved in the melted poly(1,4-butylene adipate) diol. When the polyurethane was laminated to 12 inch by 12 inch by ⅛ inch float glass samples, such as described in Example I, the 90° peel strength as determined according to NASA TECH BRIEF 65-10173 and by a Chatillon hand tester was about 4 to 5 pounds per lineal inch, and there was no loss in this degree of adhesion when bilayer laminates were subjected to 100 percent relative humidity at 120°F. after 30 days.

EXAMPLE V

A polyurethane composition such as described in Example I was prepared with the exception that 0.2 percent by weight ethylhexyl acid phosphate was used instead of 0.03 percent by weight stearyl acid phosphate. When laminated to 12 inch by 12 inch by ⅛ inch float glass samples as described in Example I, the 90° peel strength as determined by NASA TECH BRIEF 65-10173 and by a Chatillon hand tester was about 5 pounds per lineal inch. When bilayer laminates were subjected to 100 percent relative humidity at 120°F., there was no loss of adhesion after 30 days.

EXAMPLE VI

A polyurethane composition and a bilayer safety glass laminate employing such a polyurethane was prepared from the following charge:

| Ingredient | |
|---|---|
| 4,4'-methylene-bis(cyclohexyl isocyanate) (HYLENE W) | 2.214 moles |
| polycaprolactone diol | 1.000 mole |
| 1,4-butanediol | 1.195 moles |
| poly(1,4-butylene adipate) diol (M.W. 534) | 0.009 mole[1] |
| gamma-glycidoxy-propyltrimethoxysilane (Dow Corning's Z-6040) | 0.20 percent by weight[2] |
| stearyl acid phosphate | 0.04 percent by weight[2] |

[1]The poly(1,4-butylene adipate) diol had a number average molecular weight of 534 and contained one percent by weight butyl stannoic acid catalyst based on weight of the poly(1,4-butylene adipate) diol.
[2]Percent by weight based on total formula weight.

The polycaprolactone diol was prepared by condensing epsilon-caprolactone (89.47 mole percent) with 1,4-butanediol (10.53 mole percent). The resulting polyester had a hydroxyl number of 107.5 and a number average molecular weight of about 1044. The polycaprolactone diol was melted at 140°F. and mixed with the melted catalyst solution and gamma-glycidoxy-propyltrimethoxysilane and charged to a glass reaction kettle. The ingredients in the reaction kettle were heated at a temperature of 140°F. for 30 minutes under 2-3 millimeters of mercury pressure to degas the mixture and to remove trace amounts of water. Then the mix was allowed to cool to 110°F. The vacuum was released by introducing pre-purified nitrogen. Anhydrous 1,4-butanediol at a temperature of 110°F. was added while still stirring. Immediately following, 4,4'-methylene-bis-(cyclohexyl isocyanate) (HYLENE W) in a stereoisomer ratio of 55 percent trans and 45 percent cis at 110°F. and containing the stearyl acid phosphate was added to the reaction kettle while stirring. The mixture was then degassed for 8 minutes while holding the temperature at about 110°F. and a pressure of about 2 millimeters of mercury. The material was then cast in place between two 12 inch by 12 by ⅛ inch float glass sheets, as described in Example I, to provide 12 inch by 12 inch bilayer laminates. The urethane content of the poly(caprolactone urethane) was calculated to be 15 percent. Bilayer laminates had the following impact properties:

| Mean Penetration Velocity (5-pound ball drop) | | |
|---|---|---|
| 0°F. | 70°F. | 120°F. |
| 27.3 mph | 34.6 mph | 21 mph |

When 2 foot by 3 foot bilayer laminates were impacted with a 22-pound falling headform as described in Example I, there was no penetration of the laminate nor tear of the polyurethane layer at 30°F., 70°F. and 110°F. at 19 miles per hour.

The adhesion of the polyurethane to glass when laminated under the above conditions was about 4 to 6 pounds per lineal inch as determined by the 90° Peel Test according to both NASA TECH BRIEF 65-10173 and a hand measurement using a Chatillon hand tester. When a bilayer laminate is prepared as described above and put in a high humidity chamber at 100 percent relative humidity, 120°F., the degree of adhesion between the polyurethane and the glass was unchanged after 30 days.

EXAMPLE VII

A polyurethane composition was prepared as generally described in Example VI from the following charge:

| Ingredient | |
|---|---|
| 4,4'-methylene-bis(cyclohexyl isocyanate) (HYLENE W) | 2.245 moles |
| polycaprolactone diol | 1.000 mole |
| 1,4-butanediol | 1.195 moles |

| Ingredient | -continued |
|---|---|
| poly(1,4-butylene adipate) diol | 0.009 mole |
| gamma-glycidoxy-propyltrimethoxysilane (Dow Corning's Z-6040) | 0.20 percent by weight |
| lauryl acid phosphate | 0.10 percent by weight |

The polycaprolactone diol had a number average molecular weight of 1044 and the poly(1,4-butylene adipate) diol had a number average molecular weight of 534 and contained 1 percent by weight butyl stannoic acid catalyst based on weight of the polyester. The percent by weight of the gamma-glycidoxy-propyl-trimethoxysilane and the lauryl acid phosphate are percent by weight based on total formulation weight.

When 2 foot by 3 foot bilayer laminates were prepared as described in working Example I and were impacted with a 22-pound falling headform as described in Example I, there was no penetration of the laminate nor tear of the polyurethane layer at 30°F. and 70°F. At 110°F., the laminate held the headform but there was an 8 inch tear in the polyurethane.

The Severity Index results for 2 foot by 3 foot bilayer laminates prepared as described above at an impact speed of 19 miles per hour were as follows:

| 30°F. | 85°F. | 110°F. |
|---|---|---|
| 373 | 211 | 182 |

The adhesion of the polyurethane to glass when laminated under the above conditions was about 4 to 6 pounds per lineal inch as determined by the 90° Peel Test according to both NASA TECH BRIEF 65-10173 and a hand measurement using a Chatillon hand tester. When a bilayer laminate is prepared as described above and put in a high humidity chamber at 100 percent relative humidity, 120°F., the degree of adhesion between the polyurethane and the glass was unchanged after 30 days.

We claim:

1. A polyurethane composition comprising the reaction product of a polyisocyanate or a polythioisocyanate and a compound containing at least two groups which are reactive with the isocyanate or thioisocyanate groups; said polyurethane composition containing from about 0.01 to 0.30 percent by weight based on the weight of the polyurethane composition of an organic phosphorus acid selected from the class consisting of:

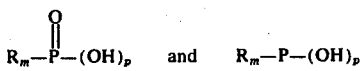

where R is an alkyl containing from 1 to 18 carbon atoms, alkyl, alkaryl, alkoxy, aryloxy or an alkaryloxy group and may be linked directly to the phosphorus atom or linked by means of an oxygen atom, $m$ and $p$ are integers of from 1 to 2 and $m + p$ must equal 3, and from 0.05 to 0.5 percent by weight of an organo-functional silane having the structural formula:

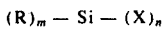

wherein $m$ and $n$ are whole integers of from 1 to 3 and $m + n$ is equal to 4, wherein X is a group which can hydrolyze to yield a hydroxyl group and R is an organic moiety selected from the class consisting of alkyl groups containing from 1 to 5 carbon atoms, aryl, vinyl and epoxy-containing organic moieties present in amounts sufficient so as to control the degree of adhesion of the polyurethane composition, when in sheet form, to glass; the weight ratio of organic phosphorus acid to organo-functional silane being from about 0.05 to 0.80:1 inclusive; said polyurethane being characterized as having a degree of adhesion to glass of about 1 to 10 pounds per lineal inch when a sheet of said polyurethane is laminated to a sheet of glass, said degree of adhesion being maintained when the laminate is subjected to 100 percent humidity, and 120°F., for at least 5 days.

2. The polyurethane composition of claim 1 in which the polyurethane is a reaction product of a polyisocyanate and an organic polyol.

3. The polyurethane composition of claim 2 in which the polyisocyanate is a cycloaliphatic diisocyanate.

4. The polyurethane composition of claim 3 in which the cycloaliphatic diisocyanate is 4,4'-methylene-bis-(cyclohexyl isocyanate).

5. The polyurethane composition of claim 2 in which the polyol is a long chain diol and is selected from the class consisting of polyether diols, polyester diols and poly(alkylenecarbonate) diols.

6. The polyurethane composition of claim 5 in which the long chain diol is poly(1,4-butylene adipate) diol having a number average molecular weight between 500 and 5000 inclusive.

7. The polyurethane composition of claim 5 in which the long chain diol is poly(1,6-hexylenecarbonate) diol having a number average molecular weight between 500 and 5000 inclusive.

8. The polyurethane composition of claim 2 in which the polyol is a mixture of a long chain diol selected from the class consisting of polyether diols, polyester diols and poly(alkylenecarbonate) diols having number average molecular weights between 500 and 5000 and an aliphatic diol having a molecular weight below 250.

9. The polyurethane composition of claim 8 in which the aliphatic diol is 1,4-butanediol.

10. The polyurethane composition of claim 1 in which the organic phosphorus acid is an organic acid phosphate.

11. The polyurethane of claim 10 in which the organic acid phosphate is an alkyl acid phosphate in which the alkyl group contains from 8 to 18 carbon atoms.

12. The polyurethane of claim 11 in which the alkyl acid phosphate is selected from the class consisting of lauryl acid phosphate and stearyl acid phosphate.

13. The polyurethane of claim 1 in which the organo-functional silane corresponds to the formula: $(R)_m - Si - (X)_n$ where $m$ equals 1 to 3, $n$ equals 1 to 3 and $m$ plus $n$ equals 4, wherein X is a group which can hydrolyze to yield a hydroxyl group and R is selected from the class consisting of alkyl, aryl, vinyl, gamma-methacryloxypropyl, beta-(3,4-epoxy-cyclohexyl), mercaptopropyl, gamma-glycidoxypropyl, gamma-aminopropyl, N-beta-(aminoethyl-gamma-aminopropyl).

14. The polyurethane of claim 13 wherein X is selected from the class consisting of halo, alkoxy and acyloxy.

15. The polyurethane composition of claim 14 wherein the organo-functional silane is gamma-glycidoxy-propyltrimethoxysilane.

16. The polyurethane composition of claim 1 which contains about 0.03 to 0.20 percent by weight organic phosphorus acid and 0.15 to 0.3 percent by weight organo-functional silane, the percentage by weight being based on the total weight of the polyurethane composition.

17. The polyurethane composition of claim 16 in which the weight ratio of organic phosphorus acid to organo-functional silane is within the range of 0.15 to 0.65:1 inclusive.

18. The polyurethane composition of claim 1 in sheet form.

19. The polyurethane sheet of claim 18 which has a thickness of 5 to 120 mils.

* * * * *

UNITED STATES PATENT OFFICE
CERTIFICATE OF CORRECTION

PATENT NO. : 3,965,057
DATED : June 22, 1976
INVENTOR(S) : Vernon G. Ammons and James C. Vanek It is certified that error appears in the above-identified patent and that said Letters Patent are hereby corrected as shown below:

Cover page, line 7 of the Abstract, "Of" should be --of--.

Column 1, line 6, "1974" should be --1973--.

Column 3, line 64, delete the first sub 6.

Column 11, line 29, "hydrogen" should be --hydrogens--.

Column 24, line 26, "thepolyurethane" should be --the polyurethane--.

Column 25, line 37, "ketle" should be --kettle--.

Signed and Sealed this

Seventh Day of September 1976

[SEAL]

Attest:

RUTH C. MASON
Attesting Officer

C. MARSHALL DANN
Commissioner of Patents and Trademarks